Nov. 25, 1952  H. F. SHUMANN  2,619,277
MULTIPLY WINDOW BAG
Filed Dec. 13, 1948
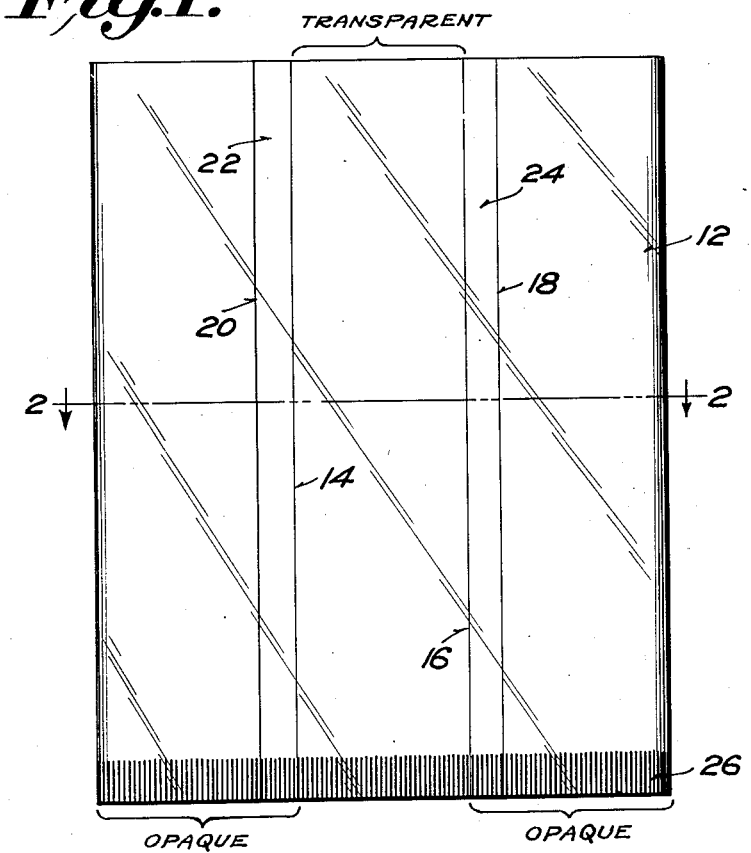
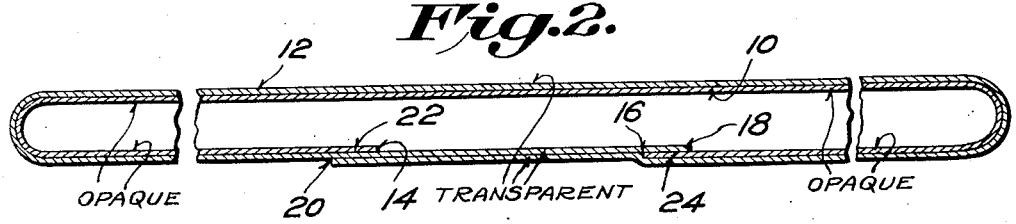
Inventor
HAROLD F. SHUMANN,
ATTORNEY Patented Nov. 25, 1952

2,619,277

UNITED STATES PATENT OFFICE 2,619,277

MULTIPLY WINDOW BAG

Harold F. Shumann, Pittsburgh, Pa.

Application December 13, 1948, Serial No. 65,019

1 Claim. (Cl. 229—55)

It is an object of this invention to provide a bag which is either opaque or translucent throughout most of its circumference but which has a transparent window throughout most of its length and which has a minimum of two plies at all points throughout its circumference.

It is a further object of this invention to provide a bag as aforesaid in which all of the longitudinal seams are heat sealed.

The above and other objects will be made clear from the following detailed description taken in connection with the annexed drawings, in which Fig. 1 is a front elevation of the bag of this invention, and Fig. 2 is a section on the line 2—2 of Fig. 1.

The prior art discloses a variety of attempts to reinforce a bag formed of transparent material such as cellophane, while leaving one or more portions of the bag transparent to provide a view of the contents. None of these, however, has provided a two-ply construction extending around the entire circumference of the bag and, in particular, none of these discloses a two-ply transparent window or panel in an otherwise opaque or translucent two-ply bag.

According to the present invention, there is provided an inner ply 10 of relatively opaque or translucent material and an outer ply 12 of transparent material. The inner ply 10 has a width less than the circumference of the finished bag so that its margins 14 and 16 fail to meet by the width of the transparent panel.

The width of the outer ply 12 is sufficiently greater than the circumference of the bag so that its edges 18 and 20 respectively overlie the edges 16 and 14 of the inner ply 10. These overlapping portions are pressed together between heated members to form seams 22 and 24 which extend longitudinally of the bag.

For the purpose of this disclosure the bag bottom is closed by a simple crimped seal 26, though obviously any bottom structure may be used.

The seam 22 comprises the margin 14 of the inner ply 10, the margin 20 of the outer ply 12 and that portion of the outer ply 12 which overlies the margins 14 and 20, while the seam 24 includes the margin 16 of the inner ply 10, the margin 18 of the outer ply 12 and a portion of the outer ply 12 overlying the overlapped margins aforesaid. This construction of the seam 24 provides double anchorage of the edge 16 of the inner ply 10.

For simplicity of illustration a flat bag has been disclosed but it will be obvious to anyone skilled in the art that the bag equally well could be made gusseted.

Preferably the bag of this invention is made on a machine of the general type disclosed in Patent No. 2,330,446, dated September 28, 1943, which operates in a step by step manner. If, however, it is desired to form the seams 22 and 24 on a continuous tuber, resort may be had to the invention described in my copending application, Serial No. 696,191, filed September 11, 1946.

I claim:

A bag comprising an inner ply of relatively opaque or translucent, flexible material having a width less than the circumference of the bag whereby to leave a substantial space between the margins of said ply, and an outer ply of relatively transparent material having a width sufficiently greater than the circumference of the bag so that the margins of said outer ply overlap each other and respectively register with and overlap the margins of said inner ply, the overlapped margins of said inner and outer plies being sealed together.

HAROLD F. SHUMANN.

REFERENCES CITED

The following references are of record in the file of this patent:

UNITED STATES PATENTS

| Number | Name | Date |
|---|---|---|
| 1,029,893 | Sanders | June 18, 1912 |
| 1,857,010 | Avery | May 3, 1932 |
| 1,903,666 | Avery | Apr. 11, 1933 |
| 2,155,057 | Moore | Apr. 18, 1939 |